US005667871A

United States Patent [19]

Goodrich et al.

[11] Patent Number: 5,667,871

[45] Date of Patent: Sep. 16, 1997

[54] SLIT SHEET PACKING MATERIAL

[75] Inventors: David P. Goodrich, Newtown; Michael C. Hurwitz, Wilton, both of Conn.

[73] Assignee: Geopax Ltd., Sandy Hook, Conn.

[21] Appl. No.: 157,277

[22] Filed: Nov. 26, 1993

Related U.S. Application Data

[63] Continuation-in-part of Ser. No. 962,944, Oct. 19, 1992, abandoned, and Ser. No. 936,608, Aug. 27, 1992, abandoned, which is a continuation-in-part of Ser. No. 851,911, Mar. 16, 1992, abandoned.

[51] Int. Cl.$^6$ .............................. B32B 3/24; B65D 65/30

[52] U.S. Cl. .......................... 428/136; 428/906; 428/135; 428/137; 428/338; 428/220; 428/215; 428/212; 428/537.5; 428/903.3; 206/814; 206/584; 206/585; 206/521; 53/435; 53/450; 229/87.02; 29/6.1; 29/6.2

[58] Field of Search .................................... 428/906, 135, 428/136, 137, 338, 220, 215, 212, 537.5, 903.3; 53/435, 450; 229/87.02; 206/814, 584, 585, 521; 29/6.1, 6.2

[56] References Cited

U.S. PATENT DOCUMENTS

| | | | |
|---|---|---|---|
| 1,065,639 | 6/1913 | Thiebaut | 428/182 |
| 2,203,084 | 6/1940 | Evans | 229/37 |
| 2,319,225 | 1/1943 | Grebe et al. | 154/46 |
| 2,345,844 | 5/1944 | Weiss | 117/98 |
| 2,382,400 | 10/1945 | Decker et al. | 229/87 |
| 3,040,968 | 6/1962 | Long | 229/87 |
| 3,065,785 | 11/1962 | Taber | 160/81 |
| 3,074,543 | 1/1963 | Stanley | 206/814 |
| 3,109,579 | 11/1963 | Crane | 229/87 |
| 3,306,513 | 2/1967 | Fishman | 229/15 |
| 3,454,455 | 7/1969 | Rasmussen | 161/112 |
| 3,550,842 | 12/1970 | Scholtz | 229/87 |
| 3,603,369 | 9/1971 | Scholtz | 150/52 R |
| 3,607,602 | 9/1971 | Greskiewicz | 156/85 |
| 3,642,967 | 2/1972 | Doll | 264/51 |
| 3,655,500 | 4/1972 | Johnson | 229/14 |
| 3,655,501 | 4/1972 | Tesch | 161/109 |
| 3,660,958 | 5/1972 | Garrison | 206/53 |
| 3,758,372 | 9/1973 | Fairbanks | 161/109 |
| 3,762,629 | 10/1973 | Bruno | 229/87 F |
| 3,799,039 | 3/1974 | Johnson | 93/1 WZ |
| 3,825,465 | 7/1974 | Stock | 161/112 |
| 4,089,090 | 5/1978 | Westberg | 29/6.1 |
| 4,105,724 | 8/1978 | Talbot | 261/112 |
| 4,265,956 | 5/1981 | Colijn | 428/134 |
| 4,832,228 | 5/1989 | Hickey | 220/408 |
| 4,856,655 | 8/1989 | Barsky | 206/524 |
| 4,921,118 | 5/1990 | Gass | 220/88 A |
| 4,937,131 | 6/1990 | Baldacci et al. | 428/131 |
| 4,949,528 | 8/1990 | Palik | 53/429 |
| 5,151,312 | 9/1992 | Boeri | 428/156 |
| 5,207,756 | 5/1993 | Alhamad et al. | 29/6.1 |

FOREIGN PATENT DOCUMENTS

| | | | |
|---|---|---|---|
| 2033605 | 12/1971 | France . | |
| 225968 | 7/1909 | Germany . | |
| 2158539 | 5/1973 | Germany | B65D 5/04 |
| 53-103070 | 2/1977 | Japan . | |
| 793015 | 4/1958 | United Kingdom . | |
| 1305829 | 2/1973 | United Kingdom . | |

*Primary Examiner*—William Watkins
*Attorney, Agent, or Firm*—Sheldon H. Parker

[57] ABSTRACT

A filling material for use in filling hollow spaces in packaging or the like comprising one or more pieces of flexible paper material. The paper material has a plurality of individual slits formed in parallel spaced rows extending transversely from one end of the paper material to the opposing end of the paper material. The slits in adjacent alternate rows are positioned adjacent the interval space between adjacent slits in the adjacent parallel row of slits. The flexible paper material is expandable by extending the opposing ends of the paper material which are parallel to the rows of slits whereby the slits form an array of openings, each opening being generally hexagonal in shape and of the same size. The length and width of the flexible filling paper material can be varied. The construction of the flexible paper filling material provides it to be easily stored in the non-expandable position and easily expanded for use in filling hollow spaces in packaging.

15 Claims, 8 Drawing Sheets

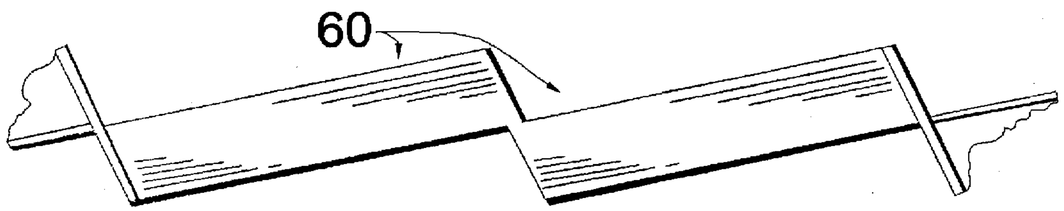
FIG 10
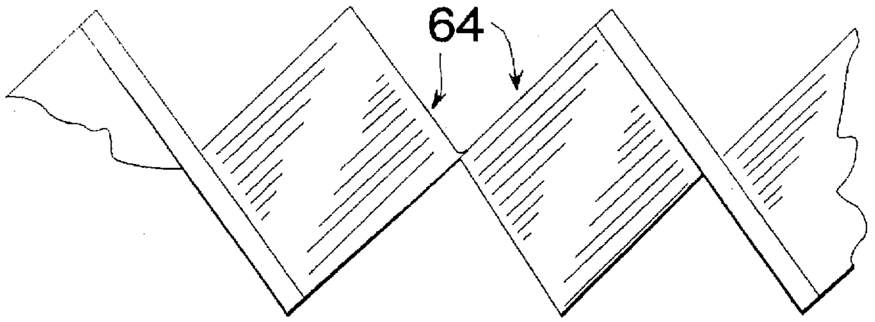
FIG. 11
FIG. 7
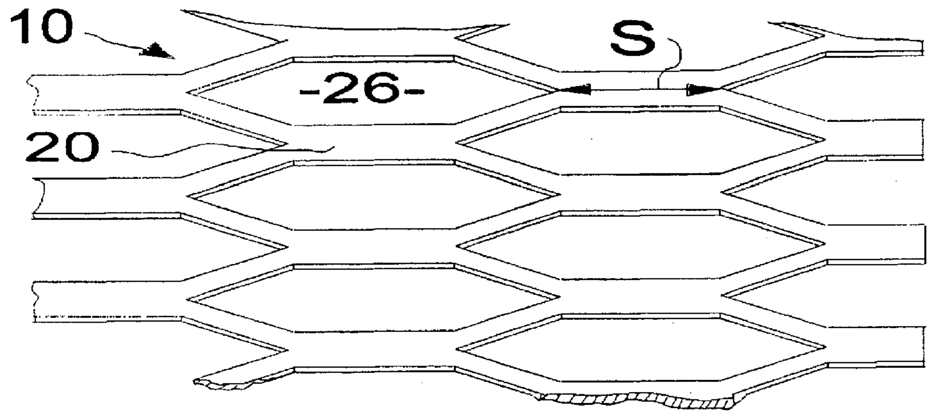

SLIT SHEET PACKING MATERIAL

CROSS REFERENCE TO RELATED APPLICATION

This application is a continuation-in-part of applications 07/962,944, filed Oct. 19, 1992, abandoned and Ser. No. 07/936,608, filed Aug. 27, 1992 abandoned which are continuations-in-part of Ser. No. 07/851,911, abandoned filed Mar. 16, 1992, the disclosures of which are incorporated herein by reference, as though recited in full.

BACKGROUND OF THE INVENTION

1. Field of The Invention

The present invention relates in general to packaging or packing material and more particularly to a new and improved filling material for filling hollow spaces in packaging shipping containers and the like.

2. Description of the Prior Art

Materials for use in filling hollow spaces in packaging or wrapping objects for protection in moving are well known in the prior art. However, to date, such materials have been either ineffective, such as newsprint, or ecologically unsound, such as styrofoam, plastic foam and plastic air bubble sheets. Use of the plastic wrap and void fill materials generates disposal problems. Although recycling of these products is possible, storage of the products for reuse is bulky and not generally feasible for home owners or some industries. Another disadvantage of existing filling materials is that they cannot be shipped in an unexpanded form thereby creating shipping cost based on bulk.

U.S. Pat. No. 4,089,090 discloses perforation of a lattice stripe in a ductile material, i.e. plastics or metal. The perforations are cut into the material without changing the width of the stripe, thereby allowing the stripe to maintain the same width whether or not perforations are cut.

U.S. Pat. No. 4,937,131 discloses a dunnage pad for use as cushioning. The sheet like stock material is rolled inwardly to form a pair of pillow-like portions abutting one another. These portions are stitched, or otherwise fastened, together. U.S. Pat. No. 3,799,039 discloses a mechanism which produces a dunnage type product for use with packing, shipping, etc. The confirmation of the dunnage type product does not allow the specific item to be wrapped, but rather cushions the item along the bottom and/or edges of a container.

U.S. Pat. No. 4,832,228 discloses an expanded paper for use in chicken coups. The light weight paper disclosed in the patent has little elastic potential energy due to the weakness of the less than 30 pound paper used in the invention of the patent and the use of an adhesive. It is noted that the weight of paper is in pounds of paper per thousand square feet prior to expansion. The light weight material can exert only a slight amount of energy absorption during the deceleration of the article being protected, until the rigid quality of the adhesive material used in the structure is encountered, at which point the deceleration can be excessive. The adhesive would interfere both with the use of the material as an impact absorber, due to the rigidity of the adhesive. It is further noted that the material would be environmentally disadvantageous because of the presence of the non-biodegradable adhesive.

While the prior art devices provide improvements in the areas intended, none of the prior art devices overcome the problems associated with general shipping and handling. None of the prior art patents disclose an environmentally safe material which can be wrapped and interlocked around, and conform to, a delicate item.

The instant invention discloses an environmentally safe filling material manufactured from recycled paper in various sizes to meet the user's needs. The cushioning affect of the filling paper is achieved through expansion at the time of use and therefore is shipped in an unexpanded form to provide an advantage for shipping and storage.

SUMMARY OF THE INVENTION

The present invention provides a new and improved packaging material for use in wrapping objects and/or in filling hollow spaces in packaging or the like. The material of the instant invention, most preferably paper, when cut in a particular pattern and expanded, increases in length, decreases in width and most importantly, increases dramatically in effective cushioning thickness.

The filling material is formed from at least one sheet of flexible, non-woven fibrous material. Preferably the fibrous material is formed of cellulosic fibers, and in particular, is biodegradable paper. Most preferably, the material is recycled paper having a stiffness greater than that of unrecycled paper and an average fiber length which is substantially less than that of unrecycled paper. Further, the recycled paper has a substantially shorter fiber than that of unrecycled paper, and consequently, has lower tendency to return to the unexpanded configuration than that of unrecycled paper. The paper sheet preferably has a thickness less than about 0.03 inches and preferably the thickness is on the order of about 0.01 inches. Preferably, 60 to about 70 pound Kraft paper, made from recycled corrugated cardboard, and about 0.007 to about 0.008 inch thick, is used in the present invention.

Each sheet has a plurality of spaced parallel rows of individual slits. The space between adjacent parallel rows is on the order of about one-eighth inch. The slits are essentially straight lines on the order of about one-half inch long. The rows extend transversely from one end of the paper material to the opposing end of said at least one sheet. Each of the rows is provided with interval spaces between consecutive slits. The interval space between the ends of consecutive slits is on the order of about one fourth the length of a slit and preferably is on the order of about three-sixteenths of an inch. The plurality of slits extend transversely from one end of the paper material to the opposing end of the paper material with the slits in adjacent alternate rows each positioned adjacent the interval space between adjacent slits in the adjacent parallel row of slits. That is, the slits of one row are essentially opposite the spaces of the next row. Preferably, the slits are arranged in a consistent, uniformly repeating pattern. While it is well known in the art to produce open cells, when the expanded material is being used to produce a cushioning material, in which the cushion is a product of the resiliency of the inclined land areas, a critical aspect of the invention, is to use a slit pattern, which for the particular paper being used, produces a hexagonal cell pattern. The larger the cell the stiffer the paper has to be to compensate for the large dimensions of the leg regions of the cells. Unlike other applications for expanded paper, as for example filters, where fluid flow through the cell openings is critical, in the instant cushioning application, the ability of the inclined land areas to function, essentially, as a spring, is the essential characteristic of the expanded paper. Not only has there been no recognition that the inclined lands can function as springs, but, also, it has not been recognized that in the hexagonal configuration, the spring effect is functionally different from the spring effect obtained with diamond shaped openings, as illustrated in the prior art, as illustrated, for example, in U.S. Pat. No. 2,656,291, FIG. 2 of Doll et al.

The term hexagonal, as employed herein, refers to the cell configuration which is formed due to the rigidity of the structure, during expansion and the rotation of the lands. In combination, the dimensions of the slits, the spaces between slits, (leg width and length) and the characteristics of the material undergoing expansion, determine whether hexagonal opening will be formed.

The term diamond shaped opening refers to a figure with four equal sides, two inner obtuse angles, and two inner acute angles. The obtuse angles are formed when the legs created by the material do not have sufficient stiffness to maintain their position and simply flow into the diamond shaped configuration. This is due to the long length of the legs relative to their width. The diamond configuration is illustrated in Doll et al. It is noted that legs of the diamond shaped structure of Doll et al are roughly "S" shaped.

The slits in each row are positioned adjacent the interval space between consecutive slits in the adjacent parallel row of slits. Thus, the parallel rows of slits are normal to parallel rows of slits and parallel rows of interval spaces.

The sheets are expandable by extending the opposing ends of each sheet which are parallel to the rows of slits forming an array of openings. Each of the openings are generally similar in shape and size and preferably are generally hexagonal in shape. The preferred pattern of slits produces polygons having an even number of side, and most preferably, produces a hexagon. When expanded to the absolute limit by tearing or breaking fibers, the angles between two pairs of sides disappears, and a rectangle is formed. Normally, even when extended to this extreme, upon relaxing of the stretching force, the hexagonal pattern reappears. In normal use, the rectangular configuration is not formed, and if formed, is not maintained. Accordingly, the term maximum expansion refers to the maximum extension of the sheet which forms hexagonal cells. The filling material has an expanded thickness on the order of at least about ten times the unexpanded thickness of the sheet and preferably can be extended the order of twenty times the unexpanded thickness of the sheet. Viewed another way, the paper material is expandable in the direction transverse to the parallel rows of slit the space by an amount on the order of at least about fifty percent greater than the length of the paper in the transverse direction. The expanded sheet is formed of openings and land areas with at least a majority of the land areas lying in a plurality of parallel planes. These planes form an angle of at least about 45 degrees with the plane of the sheets. The angle is less than 90 degrees and preferably is on the order of about 45 to 70 degrees. Most preferable is the range from 50 to 65 degrees. At the 90 degree extreme, maximum theoretical thickening is achieved, but at a loss of resiliency and flexibility. The vertical regions will provide cushioning only through crushing. Where the incline is less than 90 degrees, the cushioning is produced through the resiliency of the inclines. Where the slit pattern and the paper characteristics combine to yield hexagonal pattern, the legs of the cell are functionally tied to the inclined lands. The land areas are thereby reinforced and the spring characteristics of the expanded paper is enhanced. The tying of the legs to the lands restricts the vertical rotation of the lands. Where the incline is shallow, the vertical gain and available compression of the structure is reduced, as compared to a steep incline. While the restriction of the vertical rotation limits the expansion of the sheet and therefore the available amount of compression, the gain derived from the interaction between the legs and the lands produces a materially improved ultimate product. A hexagon formed from the combination of half inch slits with quarter inch by three sixteenths lands, one eighth inch by five thirty seconds legs, made from 0.007 inch thick, 70 pounds Kraft paper yielded a maximum land incline of roughly 60 degrees. While the optimum use of the expanded cushioning material is at the maximum expansion, less than full expansion nevertheless can be used, with the recognition that less than optimum use of the material is being obtained. A sheet employed at less than full expansion, and having less than a 45 degree incline of the lands, would normally have insufficient impact absorption capacity to protect an object in transit and would have an insufficient use of the sheet material.

When the filling material is wrapped around an article, it is in the form of a plurality of layers of interlocked expanded sheets due to the land areas of adjacent sheets of the layers of sheets nesting and interlocking with each other. Contraction of the expanded sheets is thus preventing or at least restricted.

The filling material can be stored in stacks of sheets. Alternatively, it takes the form of a single sheet in a continuous roll. The roll can be formed of a plurality of layers of sheets, such that upon unrolling, at least a pair of sheets are unrolled together. The parallel rows of slits are parallel to the machine direction of the continuous roll, thereby facilitating the rolling of the sheet during manufacture, without expanding after the forming of the slits.

The grain of the paper is preferably parallel to the machine direction of the continuous roll so as to provide maximum tear resistance, since it is difficult to tear across the grain, rather than between adjacent fibers.

Where the parallel rows of slits are transverse to the machine direction of the continuous roll, the sheet is expandable in the direction in which it is unrolled from the continuous roll, thus providing a handling convenience at the time of the wrapping process.

The flexible paper material is expanded by extending the opposing ends of the paper material which are parallel to the rows of slits. The flexible sheet paper material can be expanded prior to the wrapping of the object with the paper. Alternatively, the paper can be expanded during the wrapping process.

In the expansion process, the opposing edges of the slits are forced apart, forming an array of openings. Each of the thus formed openings are generally hexagonal in shape and of the same size. The opening action causes the land, or solid, sections between slits to bend in a direction normal to the plane of the paper. The thin sheet of paper thus is provided with an extreme increase in effective thickness. The paper in the expanded configuration can function as a spacer, due to its extended effective thickness.

The packaging material can be restored to it original configuration by applying opposing contraction forces to the edges of the paper material which are transverse to the rows of the slits. The contracting force is applied at right angle to the force which is was applied to expand the sheet, thus reversing the opening action. The paper can then be stored in a flat condition for future reuse.

BRIEF DESCRIPTION OF THE DRAWING(S)

The objects and advantages of the instant invention will become apparent when the specification is read in conjunctions with the drawings, wherein:

FIG. 7 is an enlarged, fragmentary top view of the slit sheet of FIG. 6 partially opened;

FIG. 10 is a side view of two of the raised cells of the instant invention;

FIG. 11 is a side view of an alternate embodiment of two of the raised cells of the instant invention;

DETAILED DESCRIPTION OF THE INVENTION

Figure 1:
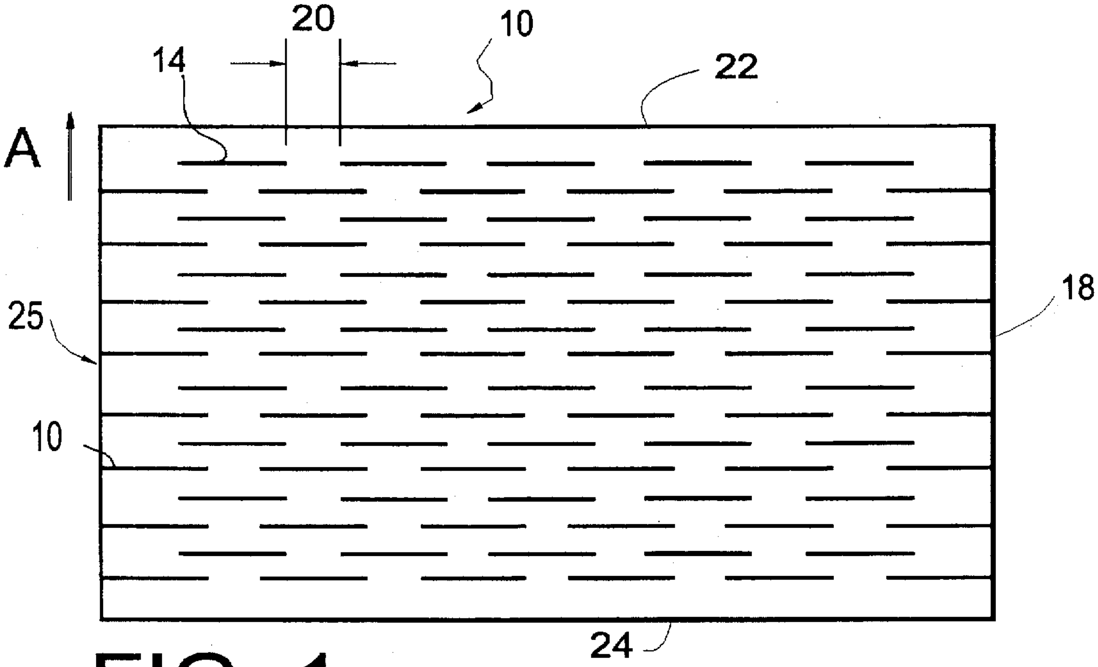
FIG. 1 is a top view of the slit sheet of the instant invention.

The strength of paper is measured by bursting, tear and tensile strength.

Tear strength is of significance in respect to the ability of the paper to resist having the slits tear during the expanding operation. Tear resistance of paper is measured in accordance with TAPPI-T-414 om-88. This method measures the force perpendicular to the plane of the paper required to tear multiple sheets of paper through a specified distance after the tear has been started Using an Elmendorf-type tearing tester. In the case of tearing a single sheet of paper, the tearing resistance is measured directly. Tear resistance of the slits is greater transverse to the grain direction than in the grain direction. This is due to the fibers having a lower resistance to being separated than to being broken or torn. Long fibers, highly oriented fibers will exhibit high transverse tear strengths but exhibit "memory" or a tendency to return to their initial position when bent. Thus, a long fiber virgin paper can provide high tear resistance, but an excessive tendency for the paper to reclose after the expansion step, that is, to exhibit memory.

Tensile strength is the force it takes to pull paper apart and is always stronger in the opposite direction to the tear strength. The tensile strength is measured in accordance with TAPPI-T 494 om-88. A paper with a 50% recycled Kraft with 40% virgin material provides a tear strength, with the grain, of 120 grams and a cross direction strength of 240 grams. The mullen test showed a 100% mullen. A 70 pound paper would, therefore, have a bursting pressure of 70 pounds. The bursting strength of recycled paper with a post consumer content is 50% or 60% mullen. In a 70 pound sample the bursting strength would be (0.6×70) and a grammage of 112 grams per square meter. The 70 pound, 100% recycled paper provides a tear strength of 96 grams in the machine direction and 120 gram in the cross direction. The tensile strength is 6,792 grams per centimeter (38 pounds per inch) in the machine direction and 3,396 grams per centimeter (19 pounds per inch) in the cross direction. For used with the instant invention, tear strength is of the great importance for resisting the tendency of the slits to tear under stress. Once the sheet of paper of the instant invention is expanded, the mullen or tensile strength has no impact upon the cushioning effect. Rigidity of the paper however, does have an affect on performance. Having the grain structure oriented predominantly transverse to the slits, has the advantage of providing optimum tensile strength, tear resistance and rigidity of the inclined land regions. Since the fibers are running in the vertical direction of the inclines, flexfire strength of the inclined lands is maximized.

In one example a 60% recycled Kraft paper mixed with 40% virgin material was used to produce expandable sheet material. The tear strength in the direction of the grain was 240 pounds and in the cross direction 120 grams. The paper showed a bursting pressure of 70 grams, (70 pound paper, 100% Mullen). The bursting strength of recycled paper with a post consumer content would typically have a 50 to 60% Mullen.

EXAMPLE I

A 70 pound natural Kraft paper was fed to a slitting unit for simultaneously cutting all of the slits while the sheets are supported on a flat bed. The paper had the following characteristics.

| | |
|---|---|
| Weight | 70 pounds (about 68–74 weight range), |
| thickness (caliper) | 7.6 mils (range from 7.4 to 8.0 mils) |
| Tensile - dry MD (machine direction) | 50 lb./in (44 minimum) |
| Tensile - dry CD - (transverse to MD) | 20 pounds (18 minimum) |
| Moisture | 5% |
| Tear Strength MD | 140 gms (130 minimum) |
| Tear Strength CD | 160 gms (140 minimum) |
| Mullen | 55 psi (50 minimum) |
| Calendar | 0 Nip |

Paper, when it is manufactured, is put through a series of calendar rolls, or "nips" to flatten the top surface for printing purposes. Zero nips will yield a bulky, fibrous paper. Eight nips produces a flat, noisy, hard surface paper. The greater the number of nips, the more fibers are crushed and the weaker the tear strength of the paper. It should be noted that tear strength is an import factor, because the paper is used in a slit form. The tear strength measurements are made on the stock material before the slitting operation. The instant invention preferably uses a zero nip stock which keeps the fibers bulky and strong. This is advantageous when the paper is being open manually or without the specialized machinery. The ability to use lighter paper is due to the fact that the machinery opens the cells smoothly, evenly, and due to the rollers, applies the opening force uniformly across the sheet. When the sheets are manufactured with open cells, a greater variety of paper weights work well. Recycled paper, however, does provided the advantage that the shorter fibers have less ability to stretch and are therefore easier to open. Obviously, the more accurate the slitting of the paper, the easier the paper is to open. Recycling of paper results in the breaking of fibers during reprocessing.

An essentially completely recycled paper can be used if the grain of the paper (the direction of strongest tensile strength) is opposite the direction of the slits. When the grain is in the same direction as the slits, the paper tends to rip before opening. While it would appear that the strength of the paper must be in the direction of expansion, what is actually required is adequate strength at the axis of the slit, so as to prevent tearing of the slits. As the paper is expanded the forces that are placed on the paper are exerted tangentially to the slit and increase as the paper is stretched.

The slit paper, indicated generally as 10, is illustrated in FIG. 1 as it would come off the slitting machine. The sheets can be formed on a flat bed slitter and produced directly as rectangular sheets, as well as on a rotary slitter and cut into individual sheets or stored directly as a continuous sheet in roll form.

The flexible sheet 10 is preferably manufactured from exclusively recycled paper with the grain of the paper running in the direction of arrow A. The flexible sheet 10 is provided with slits 14 and slits 16 are parallel to the edges 22 and 24 of the flexible sheet 12 and perpendicular to the paper grain. The slits 14 and slits 16 are placed in rows and separated from one another by land 20 and legs 21. The land 20 is a consistent size and provides the support required to prevent the paper from tearing into strips when opened. The cushioning effect is produced by the flexing of the lands and legs under a load. It is therefor necessary that the land 20 be of sufficient size to provide cushioning. The spacing between the rows of slits 14 and slits 16 must also be of sufficient size to prevent the paper from tearing. The off set positioning of the rows of slits 14 and slits 16 gives the paper resiliency when opened and is discussed in detail further hereinafter. The existence of partial slits 14 and 16 at the ends 25 and 18 of the flexible sheet 10 do not hinder the efficiency of the slit paper 10. The flexible sheet 10 when flat; lies in a first plane.

Figure 3:
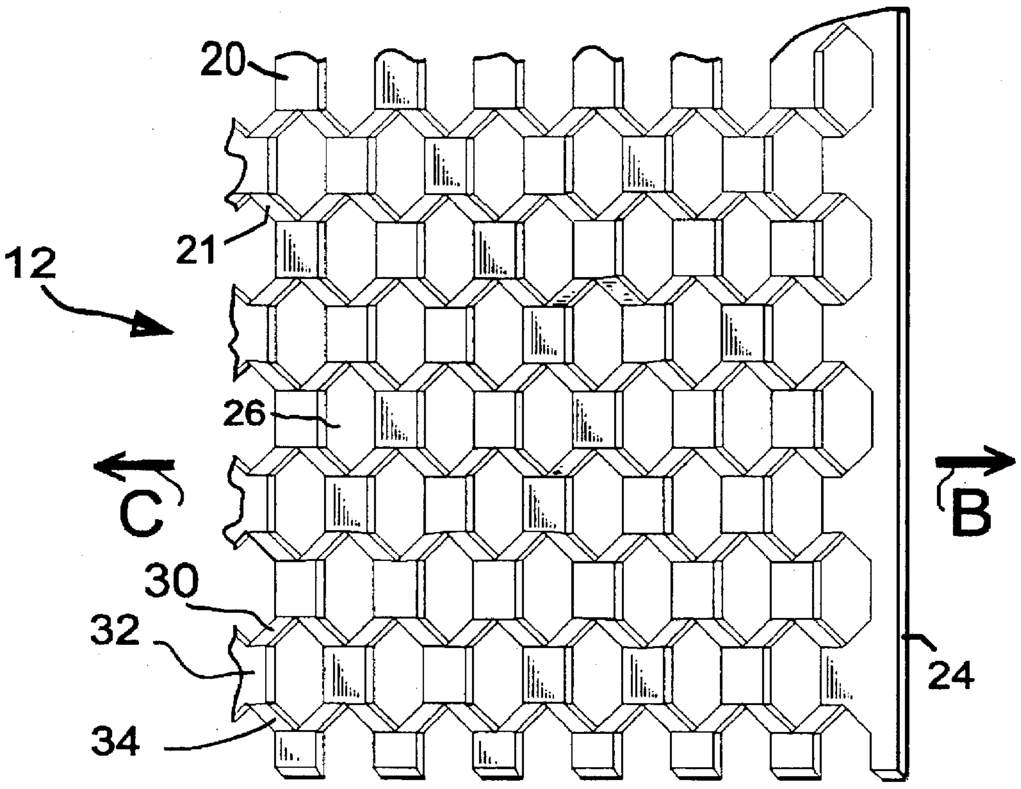
FIG. 3 is a top view of the expanded slit sheet of FIG. 1.

When expanded, the expanded sheet, indicated generally as 12, is formed of hexagonal cells 26, legs 21 and land 20 areas, as illustrated in FIG. 3. Preferably, at least a majority of the land 20 areas lie in a plurality of parallel planes. The planes of the land 20 areas form an angle of at least about 45 degrees with the plane of the sheet in flat form.

The slitting operation in Which the slits are cut into the sheet material can take several forms. In one embodiment, rectangular sheets are provide with its total number of slits in one action. The term rectangular should be understood to include rectangles in which all four sides are equal, that is, square. Where the sheet material is subjected to rotary cutting or slitting, the pressure required for the cutting action is significantly lower that which is required for the flat bed cut, since essentially only a single row or a few rows of slits are cut simultaneously. Unlike prior art structures and systems, expansion contemporaneous with slitting is not desirable. Therefore a critical balance must be struck between resistance to opening of the cells during the rewind step and ease of opening of cells during the expansion step. By achieving this critical balance and producing a flat, unexpanded sheet, the sheet material has an effective thickness which is as much as one twentieth of the thickness of a sheet of expanded material. The compact configuration provides for the optimization of shipping and storage.

It is critical for optimum strength to place the rows of slits 14 and 16 perpendicular to the grain of the paper, indicated by arrow A. The construction of paper is such that the majority of fibers run predominately in a single direction creating the grain which is the strongest direction of the paper. The placement of the rows of slits 14 and 16 perpendicular to the grain A places the strength at the axis of the slit. As the paper is stretched, the forces that are placed on the paper, arrive tangentially to the slits 14 and 16 and increase as the paper is stretched. Since the grain A prevents the slits 14 and 16 from tearing into the land 20, the slits 14 and 16 must be completely through the paper. Partial cutting of the slits 14 and 16 allows fibers to remain across the slits 14 and 16 and hinders complete opening of the slits 14 and 16 and formation of the hexagons. The uncut fibers require greater force to open the cells 26. This causes the cell's inclination pattern to change from an upward lift pattern to a downward pattern. This continues until the process is reversed. The downward positioning of the land 20 also inhibits the interlocking of the lattice effect when one sheet is placed on the other, due to the pattern reversal in adjacent layers. This is due to the reverse angle of incline pushing the sheets apart from one another instead of interlocking.

Figure 2:
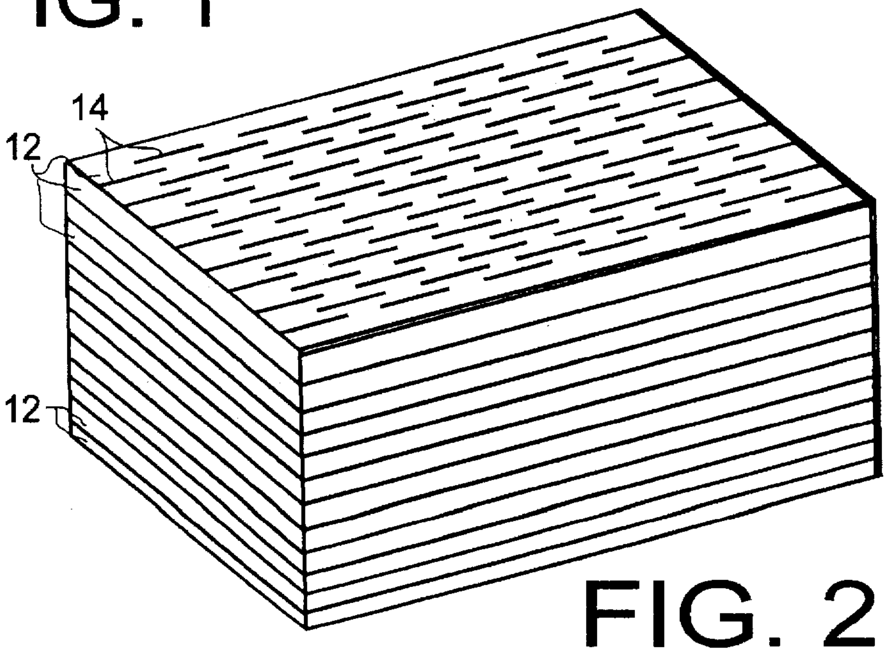
FIG. 2 is a perspective view of a stack of the slit sheets of FIG. 1.

FIG. 2 shows the slit paper 12 cut and piled for shipping. Since the slit paper 12 is produced as flat sheets, a large quantity can be shipped in a relatively compact stack. The thickness of the stack or roll of paper is influenced by the embossing which can occur when the sheet is slit. It is noted that the cleaner the cutting of the slit the less is the embossing effect. The compact nature of this material allows for the equivalent of large quantities of other shipping materials to be shipped in very little space. The thickness ratio between the slit sheets 10 as they are shipped and after they are expanded is approximately 20 to 1. The minimum expansion should be roughly 10 to 1 and preferably, at least about 15 to 1. More preferably, an expansion of 20 to 1, or better is used. The minimum expansion is based on factors such providing sufficient compression for the material to function as an impact absorber and optimum use of material. This allows a substantial cost saving in shipping and storage. The filling space created by the expansion of the slit sheets 10 is approximately 22 times that of the unexpanded sheet.

The expanded slit sheet 12 can also be "flattened" after use, to approximately its original form and can be then stored and reused several times. This would be achieved by pulling at the ends 18 and 25. This saves not only in the cost of purchasing new materials, but provides an ecological savings in a time of great need.

The slit sheet 12 is shown in FIG. 3, in an expanded state. The slit sheet 12 is expandable by simply pulling the parallel edges 22 and 24 in the direction indicated by the arrows B and C. The expansion of the slit sheet 10 opens the rows of slits 14 and 16 to form an array of hexagon cells 26. As the slit sheet is expanded, the lands 20 and legs 21, are raised to form the sections 30, 32 and 34 forming the two similar sides of each hexagonal cell 26. The rotation upwardly and horizontally forms the raised padding effect. The quantity of land 20 between the slits 14 and 16 and the distanced between the rows of slits 14 and 16 determine angle of the raised sections 30, 32 and 34 and the degree of expansion. The greater the inclination angle, the greater the support. The less than 90° inclination angle of the lands of cells 26 enable the cells 26 to contact the object without the full abrasive force of a rigid, fully vertical land, due to the ability to flex under a load. The angles created by the raised sections 30, 32 and 34 also serve to lock the slit paper 10 onto itself. The interaction of the lands 20 and legs 21, assist in retaining the "memory" of the paper, creating a pull affect as the paper tries to return to its original shape. Once a paper with is returned to its original position, it loosens on the item, no longer providing the cushioning. The locking affect also allows for easy securing and makes taping optional. The incline of the land areas is less than 90 degrees, and thus the object to be protected is subjected to significantly less abrasion than would be encountered if the object rested on a rigid support at 90 degrees to its surface. The land areas thus have an improved ability to provide resilient, non-abrasive support.

The utilization of recycled paper, when the strength is properly utilized, makes a very strong packaging medium once it is opened. Recycled paper has less stretch ability and is subject to tearing before it is opened if the grain A is not placed perpendicular to the rows of slits 14 and 16. A recycled paper with a lower bursting strength can be used since once it is opened the hexagon cells can be made stiff enough to compensate for the thinness. This stiffness can be altered at the point of manufacture by the number of calendar rolls which are used.

Figure 4:
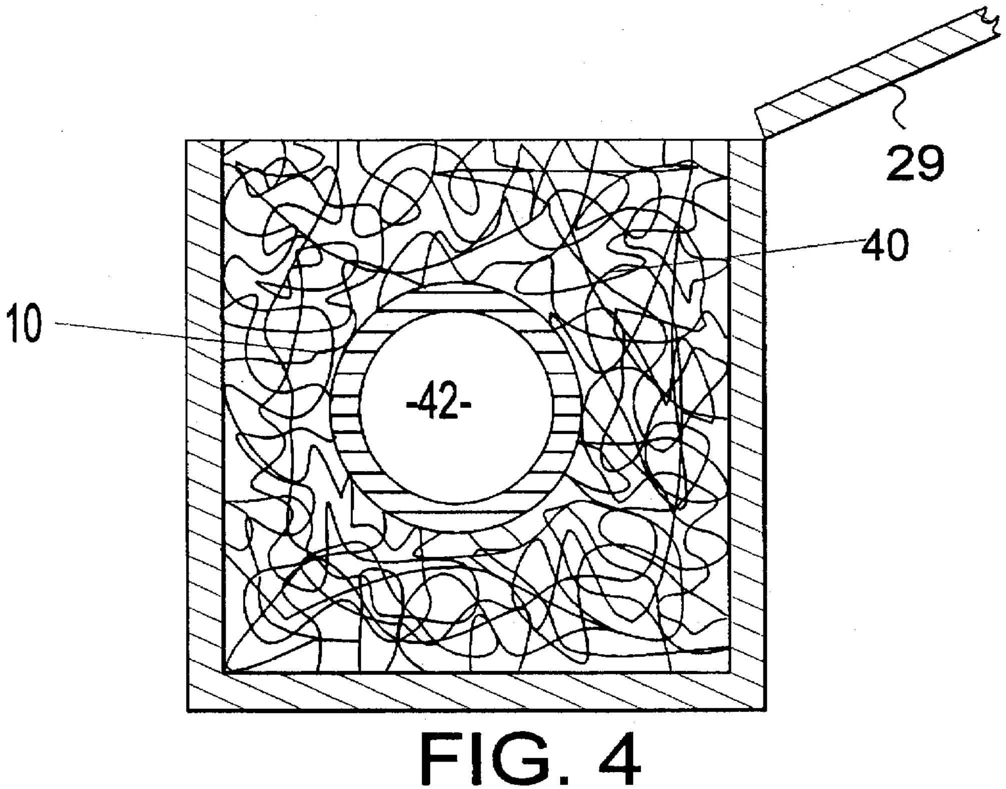
FIG. 4 is a cross-sectional view of a container utilizing the slit sheets of FIG. 1.

FIG. 4 illustrates one method of using the slit sheets 10 to pack an object 42. Slit sheets 10 have been expanded and placed "crumbled" within the container 28, filling the container 48 part way. The object 42 is placed into the container 28 and additional slit sheets 10 are expanded and crumbled, filling the open space 40 around and on top of the object 42. The hexagonal cells 26 of the slit sheets 10 fill the space around the object 42, that is, serve as a void fill, providing additional support. The raised sections 30, 32 and 34 provide a non-rigid support which allows the object to remain unaffected by outside influences (recorded in the number of G's). As forces are applied, through vibration and impacts, the inner packaging of the instant invention yields, thereby preventing the object 42 from suddenly hitting an inflexible surface.

Figure 5:
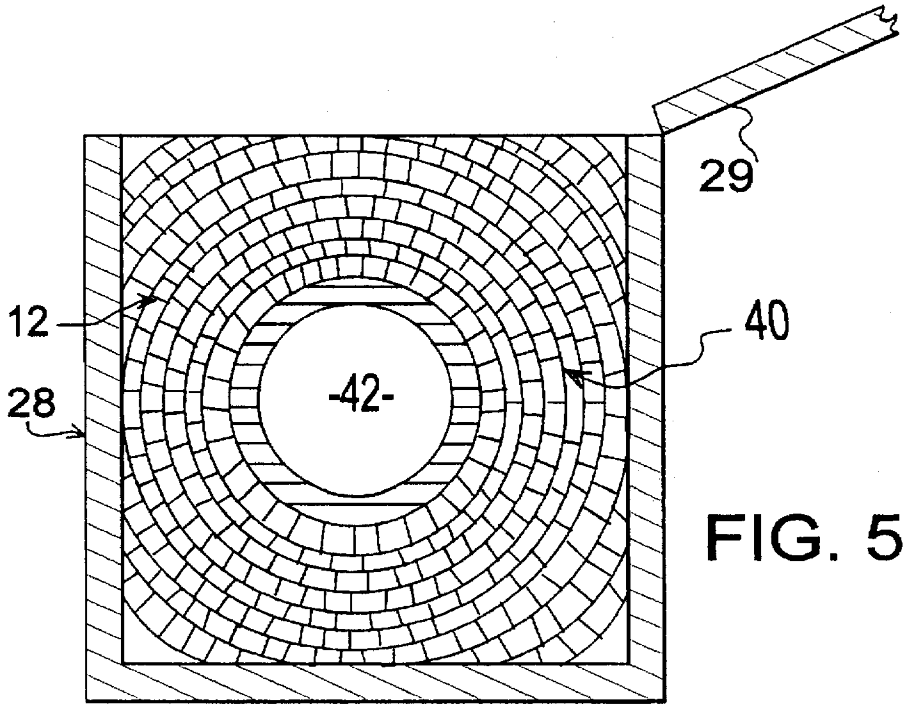
FIG. 5 is a cross-sectional view of a container using the slit sheets of FIG. 1 wrapped around an item.

An alternative use of the slit sheet 10 is illustrated in FIG. 5. A longer slit sheet 10 is used which has sufficient length to provide multiple wrappings around the object 42. The slit sheet 10 is expanded to allow the raised sections 30, 32 and 34 to form the protective hexagonal cells 26. The slit sheet 10 is wrapped around the object 42, in the direction of the arrows B and C, forming overlying layers of the sheet material. The expanded sheet is thereby held in the expanded position by the interaction of the inclined land areas of adjacent layers of the sheet. The raised sections 30, 32 and 34 form a cushioning affect and void fill. A sufficient number of sheets are used to fill the open space 40 in the container 48. The interlocking provided by the raised sections 30, 32 and 34 allow the next sheet to lock onto the previously wrapped sheets without the necessity of taping or over extending of the sheets.

Figure 6:
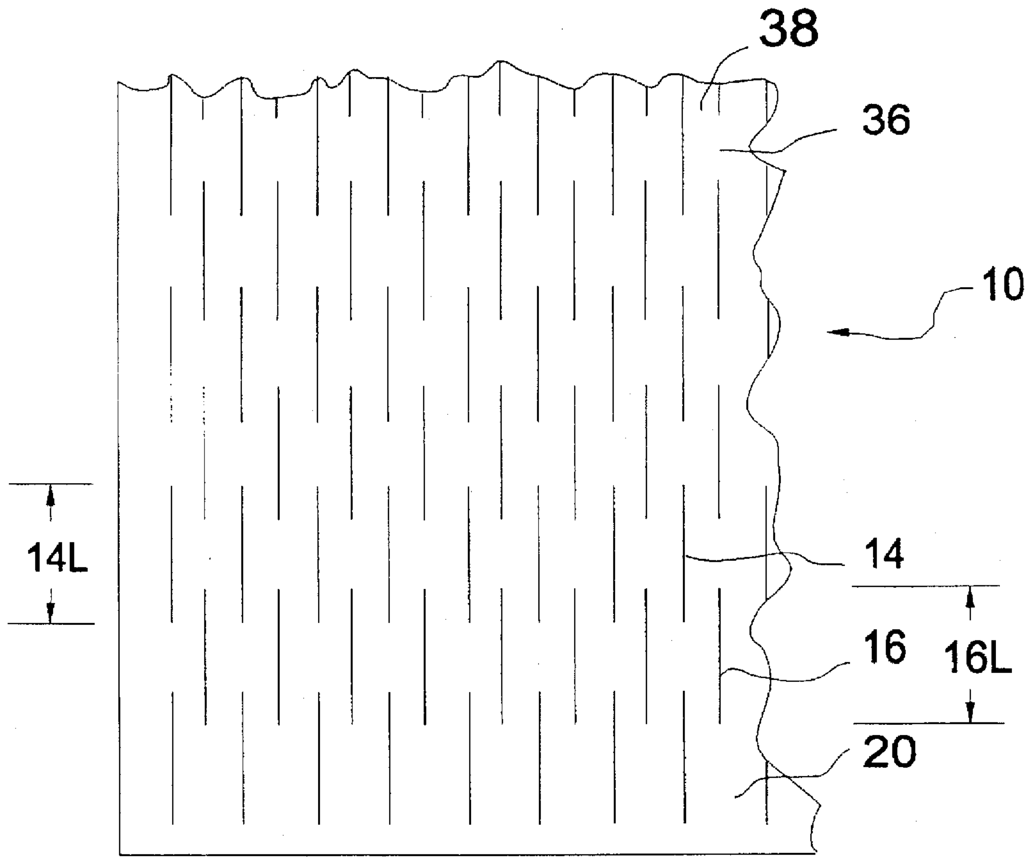
FIG. 6 is an enlarged, fragmentary top view of a slit sheet of paper.

The preferred progression of expanding the slit sheet and opening the cells 26, is illustrated in FIGS. 6, 7 and 3. FIG. 6 illustrates the unopened slits 14 and 16 and more clearly illustrates the proportions between the slits 14 and 16 and the land 20. The slit lengths 16L and 14L are maintained at an equal length throughout the cutting process. The slit spacing 36 between each of the slits 14 and 16 is also kept at an equal distance as is the row spacing 38. The narrower the row spacing 38 the narrower the legs 21 which are created. Conversely, the greater the row spacing 38, the greater is the width of the legs and the land area 20 and the fewer the cells 26. The degree of the angles is also controlled by the size of the row spacing 38, with the narrower spacing creating sharper angles. The slit spacing 36 forms the other dimension of the land 20 and has direct effect on the ease of opening and the number of cells 26. FIG. 7 illustrates the slits 14 and 16 in a partially opened state. The cells 26 are narrow and the land 20 is not fully inclined. The slits 14 and 16 have been fully extended in FIG. 3, producing a less than 90° inclination of the land 20, preferably, about a 60° inclination.

Figure 9:
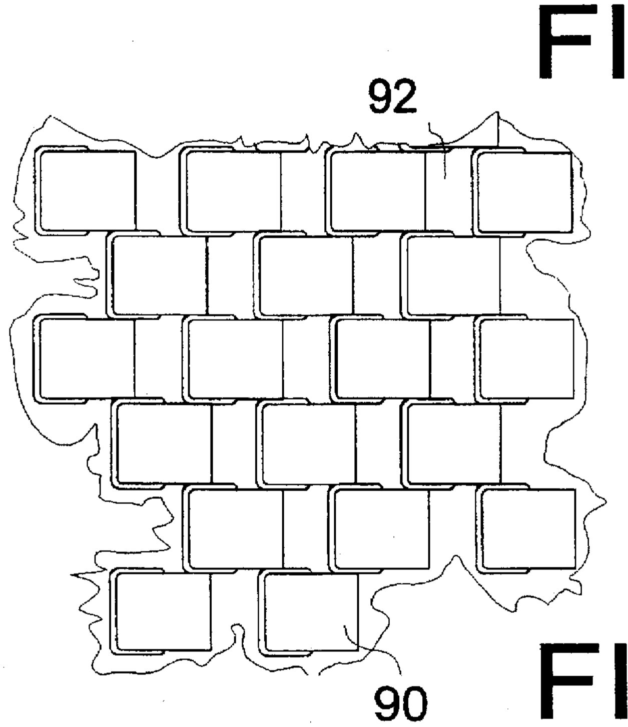
FIG. 9 is an enlarged, fragmentary top view of the slit sheet of FIG. 6 opened to approximately 180 degrees.

As illustrated in FIG. 9, the cells 90 have been stretched to their maximum and form squares or rectangles instead of hexagons. Expansion to this extent provides excessive rigidity of the land 92 due to the fact that this configuration would not be maintained without the sheet being locked in this configuration, as for example by extensive taping. In normal usage, the sheet would relax to form the hexagonal configuration. The greater the desired height, the cleaner and more complete the cut must be. As the paper is stretched, the slits 14 and 16 form hexagon cells 26 and incline the land 20 between the rows of slits 14 and 16. To provide the proper inclination, the paper must move 90 degrees; to the stretch direction and simultaneously increase in length. This causes a heavy load at each end of the slits 14 and 16 as they try to open in the opposite direction. Placing the grain A of the paper at right angles to the slits 14 and 16 prevents the slits 14 and 16 from tearing through the land 20 during the opening operation.

The length of the slit and the ratio of the land intervals between slit affects the dimensions of the polygons which are formed during the expansion step. The higher the ratio of slit length to interval length the greater is the maximum angle which can be formed between the plane of the sheet and the planes of the land areas. The greater the uniformity of the shape and size of the formed polygonal shaped open areas and the angle to which the land areas incline relative to the flat sheet, the greater is the degree to which interlocking of land areas can be achieved. Interlocking of land areas, that is, the nesting of layers of sheets, reduces the effective thickness of the sheets. However, the net effect is still a dramatic increase in effective sheet thickness. For example, 0.008 inch thick paper having a silt pattern of a ½" slit, 3/16" slit spacing, and ⅛" row spacing, produces a ¼" by 3/16" land which can expand to under about one quarter of an inch thickness and will have a net effective thickness for two layers, when nested, of about 0.375 inches. It is noted that the land width is double the width of the legs. The net effect is a useful thickness expansion of roughly 20 times the unexpanded thickness of the paper.

The longer the slit relative to the rigidity of the sheet material, the weaker is the interlocking effect and the cushioning effect due to the weakness of the expanded structure. If the slits are too small, expansion can be severely limited and cushioning can be excessively limited. This does not mean that the dimensions are narrowly critical, but rather that the dimension must be selected relative to the characteristics of the paper, as for example the degree of rigidity, and the cushioning or energy absorbing effects which are required. The resistance to expansion increases relative to the increase in the size of the land areas. It should be understood that some resistance to opening is desired. The object rests on, or contacts the edge of the sheet formed by the incline of the land areas which turns the perimeter of the openings into upper and lower edges.

Paper, unlike metal does not flow under pressure. That is to say that metal is ductile or malleable and can be slit and expanded without necessarily resulting in land areas to rise to form an incline with respect to the plane of the metal sheet. In this regard, attention is invited to U.S. Pat. No. 4,089,090 which discloses the forming of an expanded metal sheet without a concomitant decrease in the width of the sheet.

As heretofore mentioned, the slit dimensions can be varied to ease the process of opening. A ⅝" slit, 3/16" land by 3/16 row opens very easily since the number of hexagons is reduced. When the size of the hexagons are increased and the numbers decreased; the stretched thickness was increased, producing a very viable wrap material. This sizing increases the yield of the paper and provides almost the same protection as the ½" slit. This sizing provides a less expensive product utilizing a larger content of post consumer waste while maintaining the integrity of the wrap product. The ½" slit, 3/16" land by ⅛" row pattern produces a more protective wrap due to the greater number of wraps that can be made within the same volume. Thus, a 2½ pound vase dropped from a thirty inch height, with only ½" of cumulative sheet thickness around the vase, can be protected with the ½" slit, ¼ by 3/16 inch land pattern.

FIGS. 10 and 11 illustrate in more detail the raised effect of the slit sheet 10 through an end view. The raised portions 60 are at an approximately 30° angle from the original plane. The raised portions 60 represent a wider row spacing 38 than the raise portions 64 of FIG. 11. The raised portions 64 of FIG. 11 are at a greater than 45° angle. The greater the angle, the greater the interlocking and the less chance that the cells will close when adjacent layers interlock. Also, the greater the incline, the greater is the available compression. Use of the multiple layers, creating the nesting effect, prevents closure of the cells, making the angle of less importance in general use.

Commercially, the wrapping of an article can take the following sequence. Sheet material is unrolled from a continuous roll of unexpanded sheet material and expanded as it is used to wrap and enclose an object. The sheet material is then cut or ripped from the roll and the wrapping action is completed. In another embodiment, the material which has been stored in unexpanded form on a rewind roll is fed from its roll to a second roll which is rotating at a rate which is higher than the peripheral speed of the first roll, thus stretching and expanding the sheet material as it is being unrolled. This mechanism enables sheet material to be opened to its optimum condition in which the cells expand into a hexagon, short of the rectangular configuration. Preferably, the expanding system of co-pending patent application, Ser. No. 119,472, filed Sept. 10, 1993, is used to expand the slit sheets from flat sheet form or roll form. The disclosure of the co-pending case is incorporated herein, as though recited in full. In the case of essentially cylindrical objects, such as liquor bottles, the sheet material extends beyond the length of the bottle and contours around the top and bottom of the bottle thus fully enclosing the article. The nesting and interlocking action of the inclined, land areas, serves to contain the bottle within the wrapping material, without the use of adhesive tape.

The slit sheets are manufactured at high speed by utilizing a modified rotary cutter in combination with conventional unwind and conventional re-wind roller. The rotary cutter utilizes two steel cylinders, the upper containing a flywheel which contains the cutting edges. The wooden cutting die has been modified to contain knives mounted within precut slits found within the wood. In order to facilitate the addition of the modified wooden cutting die, and to make changing the damages knives easier, the upper cylinder is machined with a series of threaded holes to accommodate machined screws. A blocking mechanism is affixed to the cylinder, through use of the screws, which holds the cutting knife in place. The lower cylinder is modified by adding a flexible surface referred to as a blanket. The blanket allows the knife from the upper cylinder to pass through the paper and penetrate the surface of the blanket. This guarantees a cut through the paper and prevents the necessity of the cylinders having to be perfectly matched with even roundness and pressure.

The unwind and re-wind equipment allows the rolls of paper to be directly used, in a continuous process, directly from the paper mill. The unwind allows the paper roll to maintain constant tension as the roll reduces its diameter. A registered skid path is used on both sides of the rotary die cutter to maintain the paper in an even path. The re-wind uses tension to properly re-roll the finished goods or can be by-passed to a sheeter that cuts the roll stock into the desired length.

Figure 12:
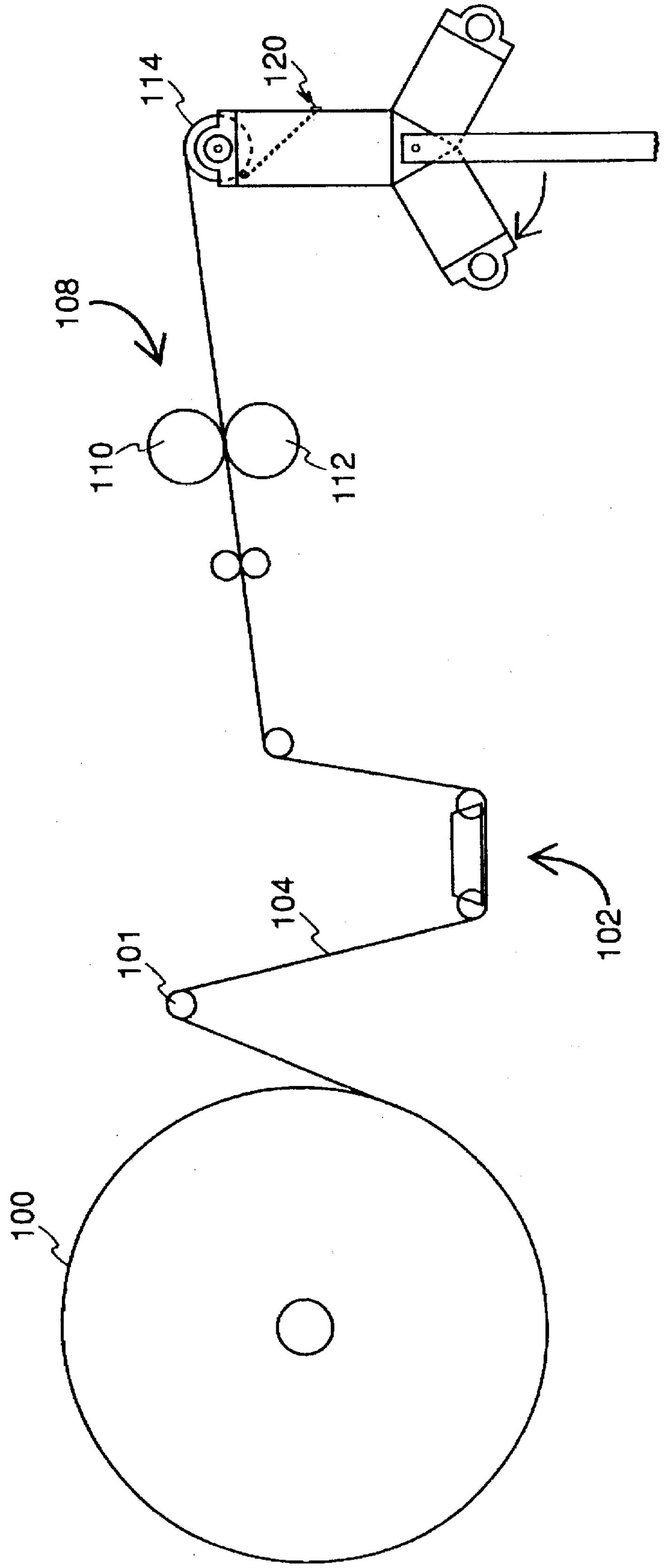
FIG. 12 is a schematic illustration of the rotary die cutting and rewind procedure.
Figure 13:
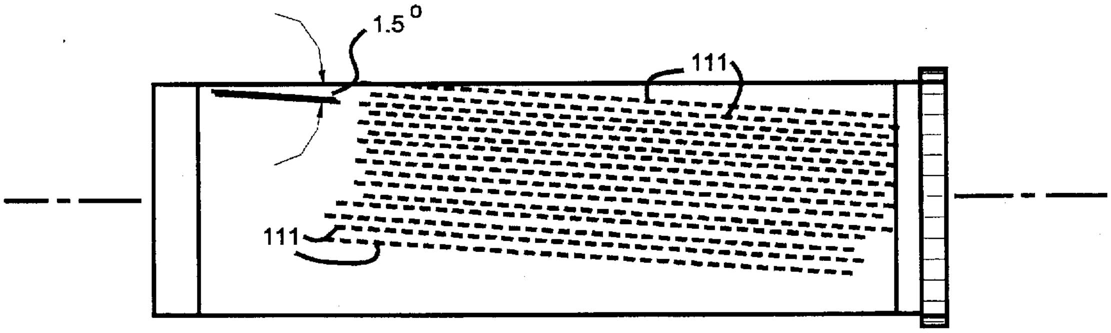
FIG. 13 is a plan view of a rotary die cutter.

Specifically, as illustrated in FIG. 12, The rotary die cutting of the expanded paper is preferably performed using a hardened steel die with tolerances of 0.001 of an inch. The anvil is a round, extremely hard cylinder. It has been found that the cutting of the plurality of slits results in a vibration of the rotary die cutter and a shortening of the life of the equipment, in particular, the die. It has been found that the vibration problem can be eliminated by offsetting the knives about 1.5° from the axis of the die. It appears that the vibration is due to the fact that the rows of knives are spaced ⅛ inch apart. Even though the cutting action is on a sheet of paper only 0.007 or 0.008 inch thick, the net effect is a chopping action and a resultant vibration. The skewing of the knives results in a continuous cutting action, since there is a simultaneous entry of a plurality of knives into the paper and withdrawing from the paper. The range is limited at one extreme by the necessity for the slits to be close to being perpendicular to the edges of the web, so that during the expansion step, the expansion proceeds in a controlled manner. That is, the paper expanded without skewing in one direction. At the other extreme, the skewing of the knives must be sufficient to provide a continuous cutting and prevent die vibration. Accordingly, the skewing of the knives, As illustrated in FIG. 13, must be at least about 0.5 but less than 5 degrees. Optimumly, the range is within 1.0 degrees and 1.75 degrees.

Since the sheet being cut is extremely thin, compared to typical paper cutting, the pressure between the anvil and the die can be fine tuned for long life. The life of the cutting knives, can be extended from 5 million revolutions to 50 million revolutions. This results in an extended life of the $20,000 tool and reduced down time.

The rotary die cutting equipment includes a paper supply roll 100 and web tension guide, indicated generally as 102, as shown in FIG. 12. The web guide controls tracking of paper from side to side, thereby facilitating high speed die cutting. The roller 101 serves to decurl the rolled paper, prior to die cutting. The paper 104 is fed between between nip rollers 106, to the die cutting station indicated generally as 108. The rotary die 110, containing the knives 111, interacts with the hard anvil 112 to produced the desired slit pattern. The rotary die is driven by a conventional power source, not shown, and can be belt driven or driven through gear teeth 115. The slit paper is then wound on a rewind roller 114. Nip rollers can be used between the rotary die cutting and the rewind roller 114.

The web tension must be less than 4.5 oz. per inch of width. For paper webs less than 20 inches in width, the problem of maintaining the rewind tension within the necessary limits is particularly severe. This problem is discussed in copending patent application, Ser. No. 119,472, filed Sept. 10, 1993. The regulation of the rewind tension can be achieved through the use of a variable tension sensor and control 120. The variable tension. sensor and control senses the amount of paper which has been rewound on the rewind roller 114. Preferably, the speed of the paper web through the rotary die 110 is essentially constant. As the amount of paper on the rewind roller 114 increases along with the diameter of the rewound web, the linear speed of the web increases. To maintain a constant tension, the rotational speed of the rewind roller must be decreased.

A highly sensitive plasma magnetic clutch or a hydraulic clutch can be used to maintain the rewind tension within the required limits, relative to the width of the paper web. When the rewind tension exceeds the proper limit, the cells open, and the paper is wound in the form of open cells. If the rewind tension is too low, the paper web is traveling at an uneconomically slow rate. Further, at low tension the roll is not tight. A tighly wound roll provides the optimum amount of material relative to the diameter of the roll. An open cell roll represents one extreme, while a tightly wound roll represents the other extreme. A loosely wound unexpanded roll is preferable to a tightly wound expanded roll. In order to amortize the cost of the equipment over a reasonable period of time, the paper through put must be maintained at the maximum possible speed. When the tension is unnecessarily low, the rewind mechanism becomes the bottle neck in the manufacturing operation.

The use of a rewind turret mechanism such as disclosed in British patent 777,576 Published Jun. 26, 1957, U.S. Pat. No. 1,739,381 and 2,149,832, provides for a continuous operation, in that the system need not be stopped when the rewind roll has the desired footage of material, preferably about 30 pounds of paper.

It is to be understood that the filling material sheets of the present invention may be formed of any desirable and suitable dimensions depending upon the hollow spaces to be filled in packaging materials. While the description of the filling material sheet member of the present invention describes one example with respect to size and thickness, this is not intended to limit the scope of the invention. Where the slit pattern and paper characteristics have interacted to form a hexagonal cell, the slit paper has sufficient resistance to expansion, to permit the sheet material in roll form, to be rewound without expansion. This is not the case for slit pattern/material characteristic combinations which fail to produce the hexagonal pattern. Where the legs of the cells are insufficiently rigid to form the hexagonal shape, the cells are also excessively easy to open. In such cases, the sheets have to have the slit patterns cut on a flat press, for the sheets to be shipped unexpanded, since the conventional rewind rolling action would expand the slit sheets.

As stated above, the instant slit pattern in combination with the paper, forms forms hexagons made up of land areas and legs. When the rigidity of the legs are sufficient to form a hexagonal, as contrasted with insufficient rigidity and the resulting diamond shape, the land is supported by the legs during compression or impact. In the hexagonal configuration, rotation of the land regions under a load, is resisted by the adjoining legs. That is, as the land area is pushed downward, the legs are pulled, thereby pulling the adjacent land, etc., in a domino effect of rigidity. Consequently, the performance with a cushioning member which opens to a hexagon is not merely better than that which is attained with a sheet which yields a diamond shaped opening as in Doll et al, the performance is of a different kind.

Figure 8:
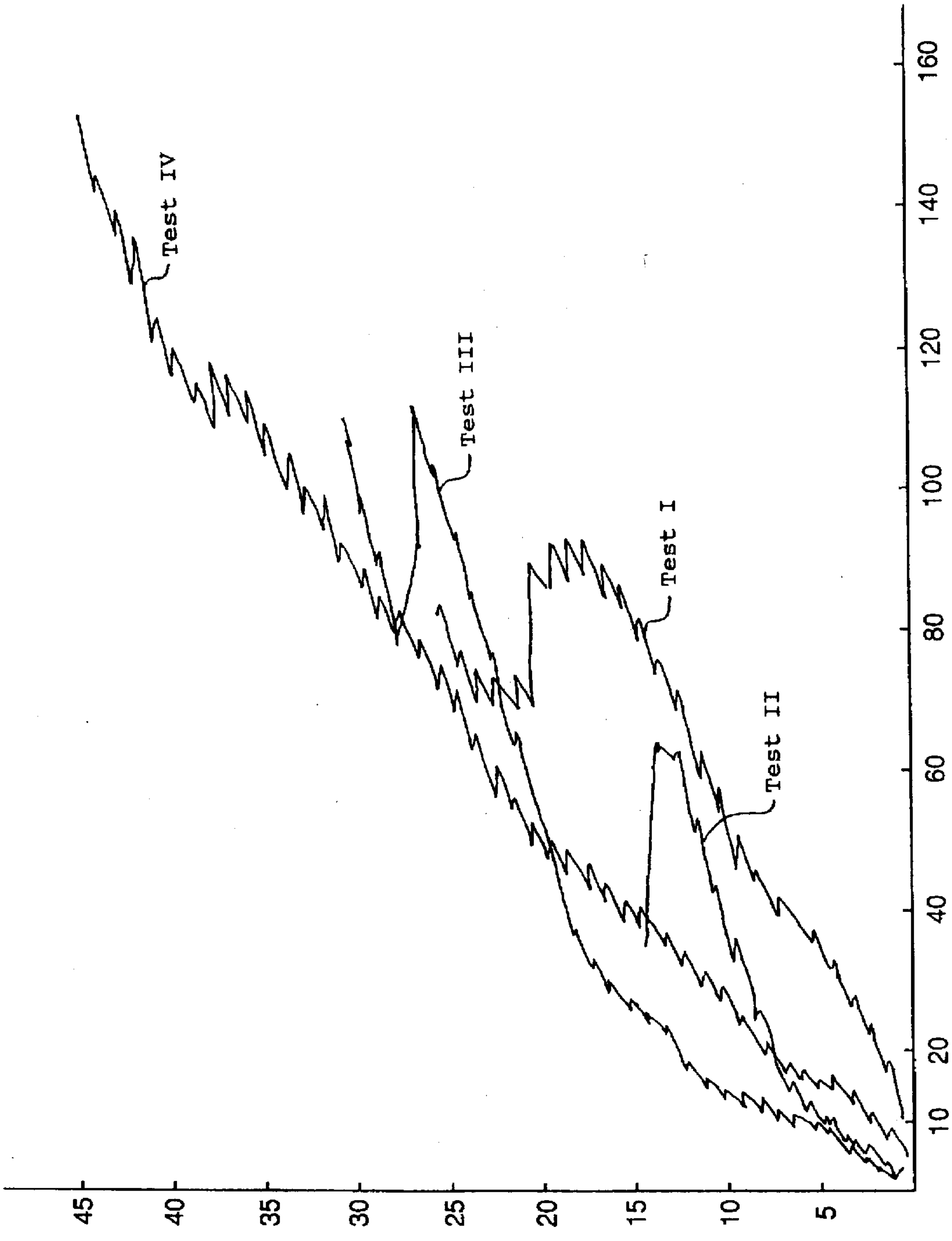
FIG. 8 is a graph illustrating comparative tests of expanded sheets with diamond shaped openings, with expanded sheets with hexagonal shaped openings.

The following Table, as graphically illustrated in FIG. 8, shows compression under load of a single layer of hexagonal cushioning material, two layers of hexagonal cushioning, a single layer of diamond shaped cushioning material and two layers of diamond shaped sheet material.

TABLE I

Comparison of compression under load of
Sheet Material With Diamond Shaped Configuration
And
Sheet Material With Hexagonal Shaped Configuration

| Inches of Deflection | Test I One Layer Hexagonal | Test II One Layer Diamond | Test III Two Layer Diamond | Test IV Two Layer Hexagonal |
|---|---|---|---|---|
| | start +5 | start +2 | start +1 | start +2 |
| .01 | 11/10 | 5 | 3/2 | 4/3 |
| .02 | 17/16 | 9/8 | 4/4 | 5/5 |
| .03 | 22/21 | 11/10 | 5/5 | 7/6 |
| .04 | 27/26 | 13/12 | 7/7 | 9/8 |
| .05 | 32/31 | 16/14 | 8/8 | 11/10 |
| .06 | 36/35 | 15/14 | 10/9 | 13/12 |
| .07 | 41/39 | 16/15 | 10/9 | 16/14 |
| .08 | 46/44 | 18/18 | 11/10 | 19/17 |
| .09 | 51/45 | 26/24 | 12/11 | 21/20 |
| .10 | 57/54 | 36/33 | 13/11 | 25/24 |
| .11 | 62/58 | 43/42 | 13/12 | 28/26 |
| .12 | 67/64 | 53/51 | 15/14 | 31/29 |
| .13 | 71/69 | 63/61 | 18/17 | 34/31 |
| .14 | 76/74 | 64/62 | 23/21 | 36/34 |
| .15 | 81/78 | 36/34 | 25/23 | 39/36 |
| .16 | 85/83 | | 27/25 | 41/38 |
| .17 | 89/84 | | 30/28 | 43/40 |
| .18 | 92/87 | | 33/31 | 47/42 |
| .19 | 92/86 | | 37/36 | 48/44 |
| .20 | 92/85 | | 47/46 | 50/47 |
| .21 | 89/68 | | 56/55 | 53/49 |
| .22 | 74/68 | | 65/64 | 57/54 |
| .23 | 74/70 | | 76/75 | 61/55 |
| .24 | 77/75 | | 84/83 | 65/63 |
| .25 | 83/82 | | 93/92 | 71/68 |
| .26 | | | 102/101 | 75/71 |
| .27 | | | 111/90 | 78/75 |
| .28 | | | 82/79 | 82/78 |
| .29 | | | 90/88 | 85/82 |
| .30 | | | 99/95 | 88/85 |
| .31 | | | 109/109 | 91/88 |
| .32 | | | 119/119 | 97/94 |
| .33 | | | | 100/95 |
| .34 | | | | 105/98 |
| .35 | | | | 108/104 |
| .36 | | | | 112/108 |
| .37 | | | | 116/109 |
| .38 | | | | 118/107 |
| .39 | | | | 115/111 |
| .40 | | | | 120/115 |
| .41 | | | | 125/120 |
| .42 | | | | 135/127 |
| .43 | | | | 137/135 |
| .44 | | | | 145/144 |
| .45 | | | | 154/153 |

The tests were conducted on a prototype test device built by Cradco Company, of Madison Va. The device employs load cells which do not compress under load and therefore provide readings of load vs. compression. Readings on the LCD scale are in pounds and the device uses a turn screw for compression of the material. A cylindrical scale is provide which provide readings in hundredths of an inch. The test material was compressed between a rigid steel member having a surface of 5 by 3⁵⁄₁₆ inches and a steel base plate, having a larger surface than the steel member, over a wooden platform. Accordingly, the effective area under compression was 16.55/144 square inches or 0.11 square feet. The compression screw was rotated to produce compression in one hundredth increments. Readings were taken initially and then after the material under compression adjusted and a load decrease was noted. The support arm of the compression screw was capable of flexing and giving false end readings after the paper was fully compressed. The readings at 0.31 and 0.32 for Test III, are indicative of readings of arm flexure. Since these readings are after the paper has crushed, the false readings had no bearing on the results, except to give an appearance of greater paper expanded thickness than actually measured with a SkillTech Dial Caliper with a 0.001. dial readout. Maximum compression of the expanded paper is determined by the expansion less the thickness of the unexpanded paper. For the expanded single layer hexagon, the measured expanded thickness was about 0.2 and for the expanded diamond was about 0.14. The land widths were 0.25 and 0.15 respectively. Both papers were measured with a SkillTech 0.001 micrometer at about 0.007 inches in unexpanded thickness. To the extent that the two sheets appeared to differ, the diamond slit material appeared to be slightly thicker and heavier than the hexagonal slit sheet material.

The paper used for the diamond shaped configuration and the hexagonal configuration was essentially the same type Kraft paper, and of the same gauge and weight. The load in each test was applied to the same number of square inches of material. The slit pattern differed, resulting in the difference in the cell configuration when opened. In the sheet material which produced the diamond shaped openings, the approximate dimensions for the lands were roughly 0.15 by 0.15 inch, and the legs were $^{0.15}/_{2}$ inch by 0.25 inch. The slits were roughly 0.7 inch long. In the sheet material which yielded the hexagonal openings,, approximate dimensions of the lands were roughly ¼ by 3/16 inch and the legs were ⅛ by 0.135. The space between the parallel slits determines the amount to which the material thickens on expansion. Increasing the distance between the parallel rows of slits strengthens the legs and creates the hexagonal shape. Stated another way, by increasing the width of the land areas and the corresponding width of the legs, relative to the dimensions in the diamond forming pattern produces hexagonal openings.

It is noted that the diamond forming sheets expanded to a thickness somewhat greater than one half of that of the hexagonal material. Consequently, the comparison can be made between the two layers of diamond sheets with the single layer of hexagonal sheets. The diamond produced an initial steep slope for a compression of about 0.12 inches in response to a load of about 15 pounds. The slope then moderated to 0.07 inches in response to a load increase of about twenty pounds. The slope then dropped resulting in about a 0.09 inch compression in response to a a seventy pound load increase. The "sweet" part of the curve was thus a region 0.07 inches/20 lb. The single layer diamond sheet gave essentially the same type of results obtained with the two layers, except for the anticipated reduced level of capacity. By way of contrast, the hexagonal sheet gave essentially, a linear relationship between deformation and load. In the two layer test, a slight slope change can be seen at about the 60 pound point. Thus, the hexagonal sheet is seen to provide classic spring characteristics while the diamond provides an undesirable deviation from a classic spring's linear relationship between load and compression. From, the foregoing, it is evident that the difference is not merely a difference in degree, but rather is a difference in kind.

With the single and double layer diamond shaped material initial compression load produces steep deformation since the legs are not reinforcing the land areas. When the legs enter into the support role, the load increase required to produce deformation, increases sharply until the sheet material crushes and fails completely. Only the mid-range of the curves shows an approximation of desirable cushioning characteristics. By way of stark contrast, with the hexagonal sheet material, the legs performing their support function from the onset and the result is a consistent performance until crushing is produced.

The "S" shaped or curved side walls of diamond shaped cells, such as in U.S. Pat. No. 2,656,291 to Doll et al, FIG. 2, bend or twist, rather than transmitting impact forces to neighboring regions. By way of contrast, in the sheet with the rigid side walls or legs of the hexagonal shape, impact forces are transmitted and dissipated along an increasing wave front. Furthermore, the diamond material went from too little impact absorption (insufficient deceleration) to too much resistance to the impact (excessive deceleration) while the hexagonal material provided the desired mid-range impact absorption. For these reasons, the performance of the hexagonal sheets will be even more impressive in drop tests than in static lead bearing comparisons.

It would appear that increasing the weight of material used will produce improved performance. Surprisingly, the materials used in the hexagonal sheets and the diamond shaped sheets of the foregoing test were both Kraft paper, of substantially the same weight and gauge. However, the slit patterns differed, one producing diamond shaped openings, the other producing hexagonal openings. It should be noted that the single layer of hexagonal opening out performed the two layer test of diamond shaped material. Thus, the performance difference is not merely a matter of increasing material weight to produce increase performance.

A Comparison of Diamond Openings with Hexagonal Openings

1. Hexagonal pattern is denser than diamond pattern and therefore uses more material per square foot of expanded sheet.

2. Hexagonal requires fewer layers than Diamond to produce minimum required cushioning. This reflects on the amount of labor required to wrap an object.

3. Hexagonal provides greater cushioning effect and therefore, a smaller sized package can be used with the hexagon than with the diamond pattern, to provide the same amount of cushioning. Therefore, Hexagonal provides a shipping cost advantage due to the use of a smaller package.

4. Hexagonal's lead bearing capacity is superior due to interaction of land and legs.

5. Hexagonal sheets readily lock against unwinding, when wound around an article, without use of tape. This is due to the combination of the nesting ability of adjacent layers and the expanded sheets being strongly biased toward the unexpanded configuration. The diamond configuration has less tendency to return to the unexpanded position, as would be expected with "S" shaped legs.

6. Hexagonal configuration exhibits the essentially linear -compression to force- relationship of a classic spring. This produces not only superior performance, but greater predictability of performance, since a linear relationship is far easier to correlate to a particular application, than a non-linear relationship.

7. Rolls of Hexagonal material can be shipped unexpanded due to configuration rigidity and consequent resistance to opening. With the hexagonal configuration, a balance is achieved between ease of opening by hand when wrapping an article and resistance to opening when rewinding. This provides a shipping and storage advantage.

From the foregoing comparison, it is evident that the hexagonal configuration is not only better, but different from the diamond configuration, with respect to performance as a cushioning material, where the cushioning is produced by the resiliency of the inclined regions supported by legs. While it would appear that the cost of paper per square foot of expanded paper would be lower for the diamond material, and therefore the diamond shaped material is more cost effective, unexpectedly the reverse is true. The overall performance superiority of the hexagonal material far offsets the higher usage of paper, per square foot of expanded material.

What is claimed is:

1. A method of protecting a object for shipping by wrapping and cushioning said object in an expanded sheet material, said expanded sheet material in expanded form being at least one sheet of extendible sheet material said at least one sheet of extendible sheet material being flexible, non-woven fibrous material, having a plurality of spaced parallel rows of individual slits in a slit pattern extending transversely from one end of the fibrous sheet material to the opposing end of said at least one sheet, each of said rows having interval spaces between consecutive slits, said slits in each row being positioned adjacent the interval space between consecutive slits in the adjacent parallel row of slits, comprising the steps of:

a) expanding a length of at least one sheet of an extendible sheet material by extending the opposing ends of said at least one sheet, to form at least one expanded sheet having an array of openings,
   said flexible, non-woven fibrous sheet material and said slit pattern, in combination producing an extendible sheet characterized by
      i) forming upon expansion, an array of hexagonal openings, said openings being bound by land areas and leg areas, and being generally similar in shape and size, in a consistent, uniformly repeating pattern, and
      ii) said land areas being rotatable to an angle of at least about 45 degrees and less than 90 degrees from its unexpanded position,
b) wrapping said at least one expanded sheet around an object, and
c) placing the wrapped object in a package.

2. The method according to claim 1, wherein said flexible material is paper, said sheet being expanded to a thickness at least about ten times the unexpanded thickness of said at least one sheet prior to wrapping said object with said paper.

3. The method according to claim 1, wherein said at least one sheet is wrapped around said object such that land areas of successive layers of sheet material interlock, thereby deterring the unwrapping of sheet material wrapped around said object.

4. The method according to claim 1, wherein said at least one sheet comprises a plurality of layers of interlocked expanded sheets of paper.

5. The method according to claim 1, wherein said at least one sheet prior to expansion is in a continuous, unexpanded roll, and further comprising the steps of, cutting a leading portion of said at least one sheet to form a substantially rectangular section, expanding said rectangular section to form an expanded wrapping material, said at least one sheet being wrapped around said object such that land areas of successive layers of sheet material interlock, thereby deterring the unwrapping of sheet material wrapped around said object.

6. The method according to claim 1, wherein said at least one sheet is a plurality of layers of sheets of paper and prior to expansion is in a continuous unexpanded roll.

7. The method according to claim 1, wherein said at least one sheet is paper in a continuous roll and wherein said parallel rows of slits are transverse to the machine direction of said continuous roll, whereby said sheet is expanded in the direction in which it is unrolled from said continuous roll.

8. The method according to claim 1, wherein said at least one sheet is paper in a continuous roll and the grain of the paper is parallel to the machine direction of said continuous roll.

9. The method according to claim 1, wherein said at least one sheet is paper and has a resistance to tear at each slit characterized by a tensile strength perpendicular to each slit on the order of at least about 40 pounds.

10. A article wrapped in a protective cushioning packaging material comprising the combination of;

an expanded cushioning material and an article,
   said material comprising,
   at least one sheet of flexible, non-woven fibrous sheet material,
      said at least one sheet having a plurality of slits in a pattern of spaced parallel rows of individual slits extending transversely from one end of the fibrous sheet material to the opposing end of said at least one sheet, each of said rows having interval spaces between consecutive slits;
      said slits in each row being positioned adjacent the interval space between consecutive slits in the adjacent parallel row of slits;

said flexible, non-woven fibrous sheet material and said slit pattern, in combination being characterized by forming upon expansion in the direction transverse to said parallel rows of slit, an array of hexagonal openings, said openings being bound by land areas and leg areas,
said openings being generally similar in shape and size, in a consistent, uniformly repeating opening pattern,
said slit pattern producing upon expansion, a maximum rotation of said land areas of less than than 90 degrees from its unexpanded position,
said land areas being rotated an angle of at least about 45 degrees
said flexible sheet material being extended and wrapped around said article, whereby said article is wrapped completely in a protective cushioning packaging material.

11. The article according to claim 10, wherein said flexible sheet material is wrapped around said article such that land areas of successive layers interlock.

12. The article according to claim 10, wherein said flexible sheet material is wrapped around said article and overlaps itself to produce successive layers that interlock.

13. A article wrapped in a protective cushioning packaging material comprising the combination of;

an expanded cushioning material and an article, said material comprising,
at least one sheet of flexible, non-woven fibrous sheet material,
said at least one sheet having a plurality of slits in a pattern of spaced parallel rows of individual slits extending transversely from one end of the fibrous sheet material to the opposing end of said at least one sheet, each of said rows having interval spaces between consecutive slits;

said slits in each row being positioned adjacent the interval space between consecutive slits in the adjacent parallel row of slits;

said flexible, non-woven fibrous sheet material and said slit pattern, in combination being characterized by forming upon expansion to at least about 130° of its unexpanded length in the direction transverse to said parallel rows of slit, an array of hexagonal openings, said openings being bound by land areas and leg areas, said openings being generally similar in shape and size, in a consistent, uniformly repeating pattern, said land areas being rotated an angle of at least about 45 degrees and less than 90 degrees from its unexpanded position, said flexible sheet material being extended and wrapped around said article and overlapping itself, whereby said article is wrapped in a protective cushioning packaging material.

14. The article according to claim 13, wherein said flexible sheet material is wrapped around said article such that land areas of successive layers interlock.

15. The article according to claim 13, wherein said fibrous sheet material is recycled paper having an average fiber length which is substantially less than that of unrecycled paper and which has a substantially lower grain orientation than that of unrecycled paper, whereby said paper has a lower orientation memory and has a lower tendency to return to the unexpanded configuration that that of unrecycled paper.

* * * * *